United States Patent
Ryan et al.

(10) Patent No.: US 11,543,677 B2
(45) Date of Patent: Jan. 3, 2023

(54) EYEWEAR HAVING DEPLOYABLE AUXILIARY DEVICES

(71) Applicants: Vance Ryan, Scottsdale, AZ (US); Anthony Campiti, Las Vegas, NV (US)

(72) Inventors: Vance Ryan, Scottsdale, AZ (US); Anthony Campiti, Las Vegas, NV (US)

( * ) Notice: Subject to any disclaimer, the term of this patent is extended or adjusted under 35 U.S.C. 154(b) by 408 days.

(21) Appl. No.: 16/903,862

(22) Filed: Jun. 17, 2020

(65) Prior Publication Data
US 2020/0400968 A1    Dec. 24, 2020

Related U.S. Application Data

(60) Provisional application No. 62/863,030, filed on Jun. 18, 2019.

(51) Int. Cl.
| | |
|---|---|
| G02C 5/00 | (2006.01) |
| G02C 5/22 | (2006.01) |
| G02C 7/02 | (2006.01) |
| G02C 11/00 | (2006.01) |
| G02C 5/14 | (2006.01) |
| G02C 9/00 | (2006.01) |

(52) U.S. Cl.
CPC ............ *G02C 5/001* (2013.01); *G02C 5/006* (2013.01); *G02C 5/146* (2013.01); *G02C 5/22* (2013.01); *G02C 7/02* (2013.01); *G02C 9/00* (2013.01); *G02C 11/10* (2013.01)

(58) Field of Classification Search
CPC .......... G02C 5/001; G02C 5/006; G02C 5/04; G02C 5/143; G02C 5/146; G02C 5/22; G02C 7/02; G02C 9/00; G02C 11/06; G02C 11/10; G02C 2200/08; G02B 27/0172; G02B 27/0176
See application file for complete search history.

(56) References Cited

U.S. PATENT DOCUMENTS

| | | | |
|---|---|---|---|
| 4,666,266 A | 5/1987 | Morrison | |
| 7,175,274 B1 | 2/2007 | Markson | |
| 7,431,450 B2 | 10/2008 | Huang | |
| 7,484,847 B2 | 2/2009 | Fuziak, Jr. | |
| 7,753,520 B2 | 7/2010 | Fuziak, Jr. | |
| 7,798,638 B2 * | 9/2010 | Fuziak, Jr. | G02B 27/0176 351/158 |
| 8,038,292 B2 * | 10/2011 | Matsumoto | G02C 5/20 351/158 |
| 8,944,590 B2 | 2/2015 | Blum et al. | |
| 9,442,305 B2 | 9/2016 | Blum et al. | |
| 9,465,216 B2 * | 10/2016 | Park | G02B 27/0179 |
| 9,588,355 B2 | 3/2017 | Cohn | |
| 9,635,222 B2 * | 4/2017 | Blum | H04N 5/2257 |
| 9,753,287 B2 * | 9/2017 | Chow | G02B 27/0176 |

(Continued)

*Primary Examiner* — Mustak Choudhury
(74) *Attorney, Agent, or Firm* — Brannon Sowers & Cracraft PC (57) ABSTRACT

Eyewear having one or more electronic devices stowable and deployable from storage cavities disposed in one or both temple arms of the eyewear are described. The devices are deployable through passages in the eyewear frame which are covered when the devices are in the stowed position. Devices may be changed either by removing and replacing a device or by removing and replacing a temple arm on a particular set of eyewear.

20 Claims, 4 Drawing Sheets

(56) References Cited

U.S. PATENT DOCUMENTS

| | | | |
|---|---|---|---|
| 9,766,482 B2 * | 9/2017 | Cazalet | G02C 7/02 |
| 9,823,494 B2 * | 11/2017 | Blum | H02J 50/12 |
| 10,642,050 B1 * | 5/2020 | Kothari | H04N 5/225251 |
| 10,712,573 B2 * | 7/2020 | Jones | G02C 5/20 |
| 2010/0061579 A1 * | 3/2010 | Rickards | G02C 11/10 |
| | | | 381/375 |

* cited by examiner

EYEWEAR HAVING DEPLOYABLE AUXILIARY DEVICES

TECHNICAL FIELD

The present disclosure relates generally to eyewear and more particularly to eyewear having deployable auxiliary devices.

BACKGROUND

Video display screens can be made small and light enough to be easily wearable and portable on a person. Such screens have become small enough that they can be integrated onto eyeglasses so that a user may view video while wearing the glasses. Eyeglasses equipped with video screens allow a user to watch video signals provided wirelessly by portable electronic devices such as mobile phones, tablets, portable computers, and the like. Other electronic devices such as microphones and speakers have also been mounted to eyeglasses.

A number of different eyeglass designs have included video screens such as U.S. Pat. No. 7,798,638 to Fuziak, Jr. ("Fuziak") discloses eyeglasses having deployable video screens mounted to the temple armpiece of the glasses. Such designs have limitations, however, such as that the screens are visible even when in the stored position. Additionally, such designs only allow for the use of a single type of electronic device (i.e., a video screen). There remains room for improvement in such designs to allow for better storage and deployment of electronic devices in eyeglasses.

SUMMARY OF THE INVENTION

In one aspect, eyewear which includes a frame having left and right lenses as well as left and right temple arm member extending rearwardly from the left and rights sides of the frame. The frame further includes at least one through passage extending through the front and body of the frame and into a storage cavity disposed within the body of one of the left and right temple arm members. The frame further includes a cover disposed over the through passage which is movable between an open and a closed position. Disposed within the storage cavity is an electronic device which is movable between a stowed position contained entirely within the storage cavity and a deployed position which is located at least partially in front of the frame of the eyewear. Electronic devices include one or more of video display screens, video projectors, cameras, lights, microphones, speakers, lenses, sensors, and combinations thereof. The storage cavity may also include a processor unit and a battery in electronic communication with the electronic device. One electronic device may be removed and replaced with another electronic device.

In another aspect, eyewear which includes a frame having left and right lenses as well as left and right temple arm member extending rearwardly from the left and rights sides of the frame. The frame further includes two through passages extending through the front and body of the frame and into storage cavities disposed within the body of each of the left and right temple arm members. The through passages are each covered by a cover which is movable between an open and a closed position. Disposed within each storage cavity is an electronic device which is movable between a stowed position contained entirely within a storage cavity and a deployed position which is located at least partially in front of the frame of the eyewear. Electronic devices include one or more of video display screens, video projectors, cameras, lights, microphones, speakers, lenses, sensors, and combinations thereof. Each storage cavity may also include a processor unit and a battery in electronic communication with the electronic devices.

In still another aspect, eyewear includes a frame having left and right lenses mounted therein as well as left and right temple arm members extending rearwardly therefrom. The frame further includes a through passage located on the front and disposed in front of each of the left and right temple arm members. A cover member disposed over each through passage and movable between a stowed position and a deployed position is also included. Each of the left and right temple arm members includes a storage cavity therein as well as a tip portion. The storage cavities each include an open end disposed distal from the tip portion and the open ends being aligned with the through passages. Disposed within each storage cavity is an electronic device which is movable between a stowed position and a deployed position at least partially in front of the frame.

DETAILED DESCRIPTION

The devices disclosed herein include eyewear in the form of eyeglasses having one or more deployable devices stowed within compartments in one or both arm temple members of the eyewear. The exact size, configuration, and nature of the devices can vary, but may include one or more of video display screens, video projectors, cameras, lights, microphones, speakers, lenses, sensors, and combinations thereof. Video displays may be liquid crystal displays, organic semiconductor displays, nanotube-based displays, or other display screens, for example. Cameras may include an integrated flash feature, may be video and/or still cameras, and may be capable of capturing images outside of the visible spectrum (e.g., infrared). Lights may include LED or other light sources which produce light in the visible spectrum or outside the visible spectrum (e.g., infrared, ultraviolet, lasers). Examples of sensors include those capable of detecting particular frequencies of light, air quality, contaminants, radiation, and the like. Combinations of devices include those which work together to produce a desired effect. For example, one arm member might include a camera capable of recording in the infrared spectrum while the other arm member includes a video display screen capable of displaying information from the camera allowing a user to view hot spots or heat leaking around windows in a structure. Other possible combinations of devices are also contemplated, including those which are unrelated and do not complement one another or work together.

Figure 1:
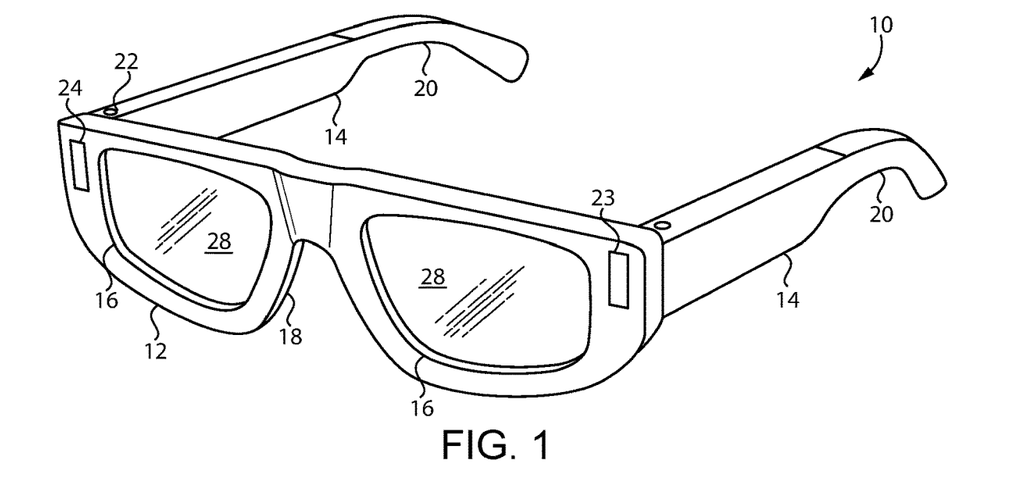
FIG. 1 is a perspective view of eyewear, according to one embodiment.

Referring now to FIG. 1 which shows a perspective view of eyewear 10 according to one embodiment. In this particular example, the eyewear 10 comprises glasses having a frame member 12 and two temple arm members 14 (one left side and one right side). Frame member 12 includes a nose rest 18 and two lens openings 16 each of which retain a lens 28 (one left side and one right side). Lens 28 may be a conventional lens, prescription lens, safety lens, polarized, light-screening/sunglass lens, or combinations thereof as desired. The lens 28 in each opening 16 do not have to be identical to one another. Lens openings 16 may be fixed or alternatively may support removable/replaceable lenses. In other embodiments, the frame member may include a single lens/screen opening which supports a single lens which spans across both eyes of a user. Frame member 12 further includes cover members 23, 24 which cover and protect one or more deployable devices stored within arm members 14 as will be described in greater detail later. Each arm member 14 includes a tip portion 20 designed to rest on the ear of a wearer. In this example, the tip portion 20 is shown as curved, but in other examples they may be straighter or more curved as desired. The arm members 14 are secured to the frame member 12 using at least one fastener 22. The fastener may be a screw, pin, or other securing member as desired.

Figure 2:
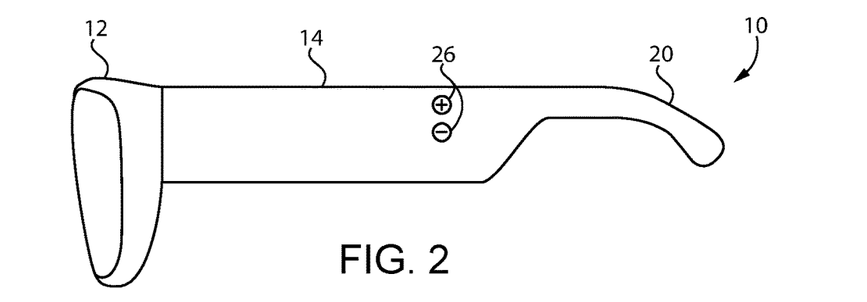
FIG. 2 is a side view of eyewear, according to one embodiment.
Figure 3:
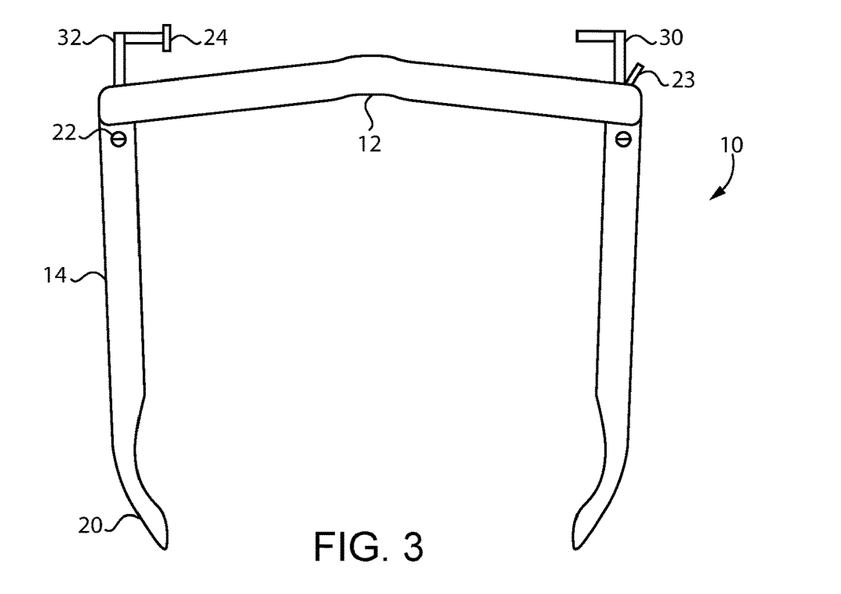
FIG. 3 is a top view of eyewear, according to one embodiment.

As seen in FIG. 2, in this particular example the arm member 14 includes an external control interface 26. The external control interface 26 in this particular example comprises two buttons. In other examples an external control interface might be one or more of a dial, wheel, touchpad, slide, infrared (IR) sensor, radio frequency (RF) sensor, WIFI, and the like. In still other examples, eyewear 10 includes no external interface features and uses wireless interface controls such as WIFI, IR, RF, Bluetooth® and the like. A top view of eyewear 10 is shown in FIG. 3. In this view, deployable devices 30, 32 are shown in the deployed position. In this particular example, cover 23 is hinged so that it swings open when device 30 is deployed and swings back closed when device 30 is stowed (as seen in FIG. 1). Cover 24 is attached to device 32 such that when device 32 is deployed cover 24 moves with the device. When device 32 is stowed cover 24 moves back to the closed position as shown in FIG. 1.

Figure 4:
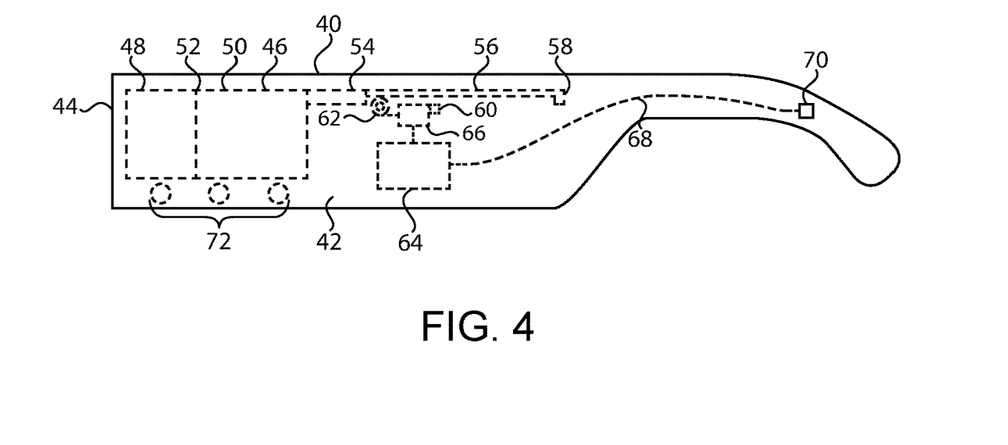
FIG. 4 is a diagrammatic side view of an eyewear temple arm, according to one embodiment.

FIG. 4 shows a diagrammatic side view of an arm member 40 according to one embodiment. In this particular example, arm member 40 includes a storage cavity 42 which is open at one end 44 sized and configured so as to allow for the deployment and stowage of a device 46 therethrough. The device 46 may be any one of those described above, but in this example includes a first portion 48 connected to a second portion 50 by a hinged portion 52. The first portion 48 might be, for example, a video display screen and the second portion 50 a support to hold the display screen in the deployed position. The device 46 in this example rests on a plurality of rollers 72 which support the device when in the stowed position and allow the device to move between the stowed and deployed positions. The device 46 is operationally attached to a control arm member 54 which includes a drive portion 56 and a stop portion 58. The drive portion 56 includes a linear rack portion or railway configured to interface with a drive gear 62. The stop portion 58 is designed to contact a stop block 60 and prevent the device 46 from being removed entirely from the arm member 40. In this example, the stop block 60 is operationally connected to a processor unit 66. The stop block 60 and stop portion 58 further include contact surfaces which allow them to be in electronic communication when touching. Such a configuration allows information and/or power to be transmitted from the processor 60 to the device 46 when the stop block 60 and stop portion are in contact.

The processor 60 may include one or more of memory, data storage, wireless communication capabilities, and the ability to store and run programs for the operation of a particular device 46. The arm member 40 further includes a battery 64 operationally connected to the processor 66. The battery in this example is a rechargeable battery such as a lithium ion battery (LI), lithium ion polymer battery (LiPo), nickel metal hydride battery (NiMH), and the like. In other examples, the battery may be removed and replaced rather than recharged. The battery 64 is operationally connected by a wire 68 to a port 70. Port 70 allows for the transmission of power and/or information into and out of the battery 64 and/or processor 60. Port 70 may be of any desired configuration such as micro-USB, IEEE 1394 (FireWire®), and the like. Optionally, the battery 64 may be rechargeable using wireless charging such as by inductive charging.

Figure 5:
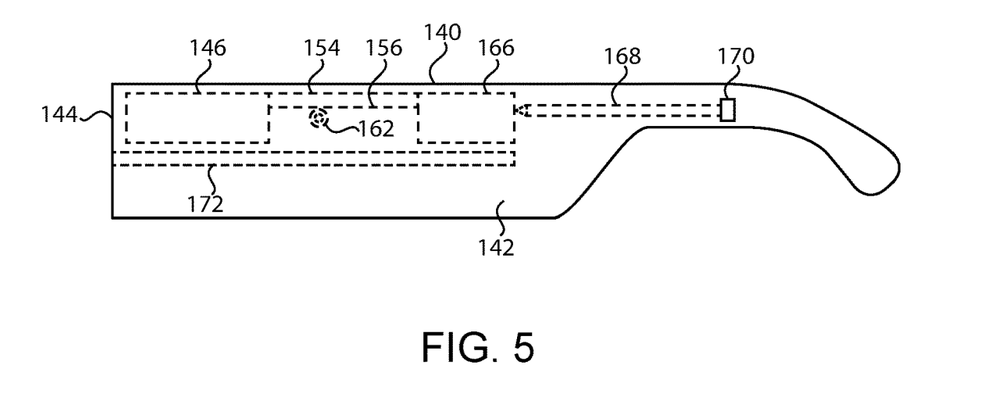
FIG. 5 is a diagrammatic side view of an eyewear temple arm, according to one embodiment.

Another example of a temple arm 140 is shown in FIG. 5. In this example, the temple arm member 140 includes a storage cavity 142 which is open at one end 144 sized and configured so as to allow for the deployment and stowage of a device 146 therethrough. The device 146 may be any one of those described above, but in this example is a unitary body. The device 146 rests and rides along a track 172 which supports the device when in the stowed position and allows the device to move between the stowed and deployed positions. The device 146 is operationally attached to a control arm member 154 which includes a drive portion 156 having a linear rack portion or railway configured to interface with a drive gear 162. The control arm member 154 is operationally connected to a processor unit 166. In this example, the processor unit 166 includes one or more of a rechargeable battery, memory, data storage, wireless communication capabilities, and the ability to store and run programs for the operation of a particular device 146. The processor unit 166 is operationally connected by a wire 168 to a port 170. Port 170 allows for the transmission of power and/or information into and out of the b processor unit 166. Port 170 may be of any desired configuration such as micro-USB, IEEE 1394 (FireWire®), and the like.

Figure 6:
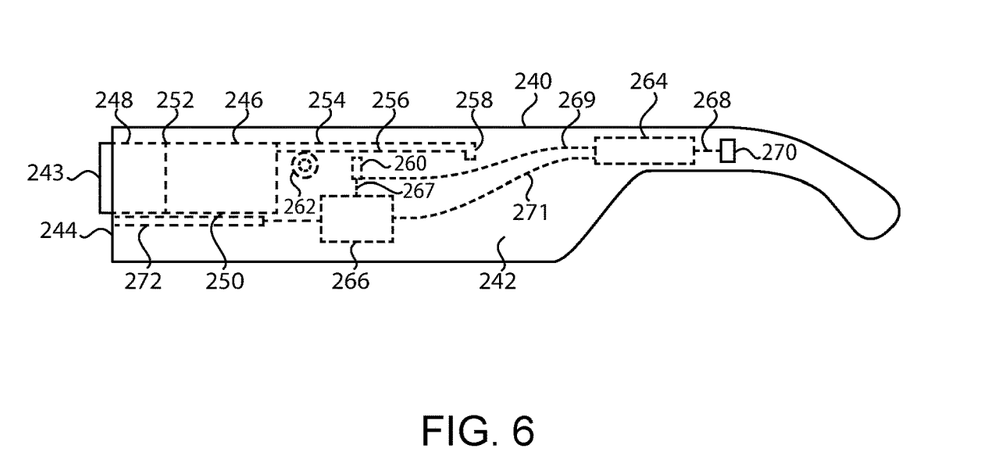
FIG. 6 is a diagrammatic side view of an eyewear temple arm, according to one embodiment.

FIG. 6 shows a diagrammatic side view of an arm member 240 according to another embodiment. In this particular example, arm member 240 includes a storage cavity 242 which is open at one end 244 sized and configured so as to allow for the deployment and stowage of a device 246 therethrough. The device 246 may be any one of those described above, but in this example includes a first portion 248 connected to a second portion 250 by a hinged portion 252. The device 246 in this example rests on a slide rail 272 which supports the device 246 when in the stowed position and allows the device 246 to move between the stowed and deployed positions. The device 246 is operationally attached to a control arm member 254 which includes a drive portion 256 and a stop portion 258. The drive portion 256 includes a linear drive portion configured to interface with a drive wheel 262. The stop portion 258 is designed to contact a stop block 260 and prevent the device 246 from being removed entirely from the arm member 240. In this example, the stop block 260 is operationally connected to a processor unit 266 and to a battery 264 by wires 267, 269. The stop block 260 and stop portion 258 further include contact surfaces which allow them to be in electronic communication when touching. Such a configuration allows information and/or power to be transmitted from the processor 260 to the device 246 when the stop block 260 and stop portion 258 are in contact.

The processor 260 may include one or more of memory, data storage, wireless communication capabilities, and the ability to store and run programs for the operation of a particular device 246. The arm member 240 further includes a battery 264 operationally connected to the processor 266 by a wire 271. The battery 264 is operationally connected by a wire 268 to a port 270. Port 270 allows for the transmission of power and/or information into and out of the battery 264 and/or processor 260.

Figure 7:
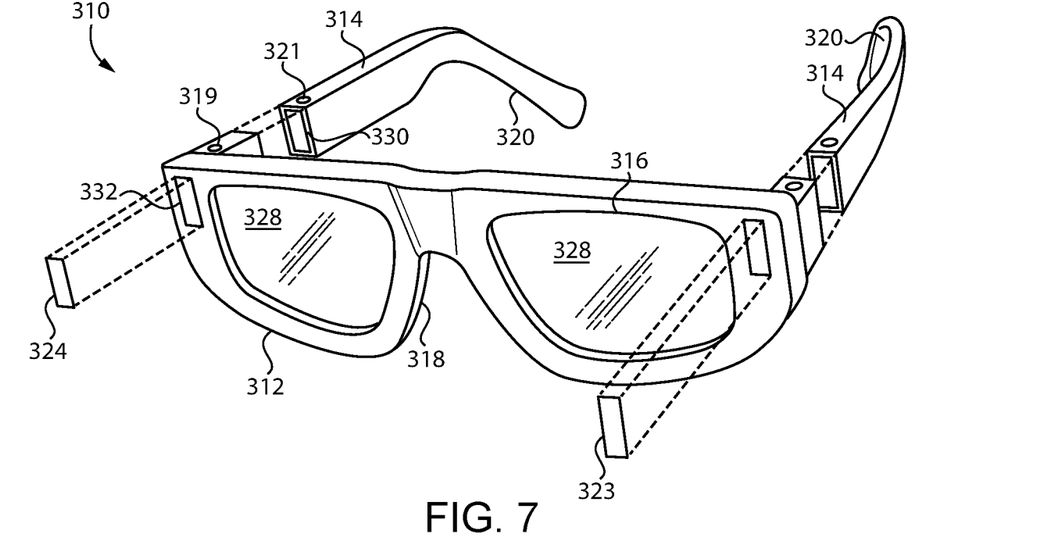
FIG. 7 is a partially exploded diagrammatic view of eyewear, according to one embodiment.

FIG. 7 shows a partially exploded diagrammatic view of eyewear 310 according to another embodiment. In this example, the eyewear 310 is glasses having a frame member 312 and two temple arm members 314. Frame member 312 includes a nose rest 318 and two lens openings 316 each of which retain a lens 328. Lens 328 may be a conventional lens, prescription lens, safety lens, polarized, light-screening/sunglass lens, or combinations thereof as desired. The lens 328 in each opening 316 do not have to be identical to one another. Lens openings 316 may be fixed or alternatively may support removable/replaceable lenses. In other embodiments, the frame member may include a single lens/screen opening which supports a single lens which spans across both eyes of a user. Frame member 312 further includes covers 323, 324 which cover and protect one or more deployable devices stored within storage cavities 330 in arm members 314. Each arm member 314 includes a tip portion 320 designed to rest on the ear of a wearer. In this example, the tip portion 320 is shown as curved, but in other examples they may be straighter or more curved as desired. The arm members 314 are secured to the frame member 312 using at least one fastener (not shown) secured through an arm fastener passage 321 and a frame fastener passage 319. The fastener may be a screw, pin, or other securing member as desired. The frame member 312 further includes a through passage 332 disposed distal from the tip portion 320 and sized and positioned to align with the storage cavity 330 of each arm member 314. In this example, each arm member includes a storage cavity, but in other examples only one arm may have a storage cavity whereas the other arm is solid.

Figure 8:
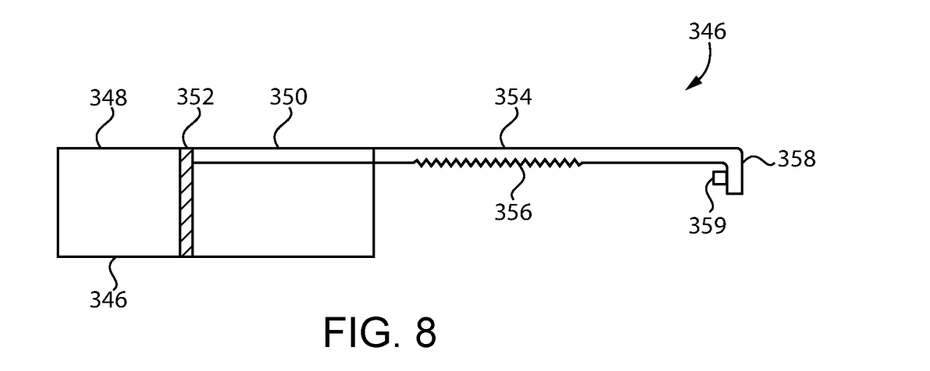
FIG. 8 is a perspective view a deployable device insert, according to another embodiment.
Figure 9:
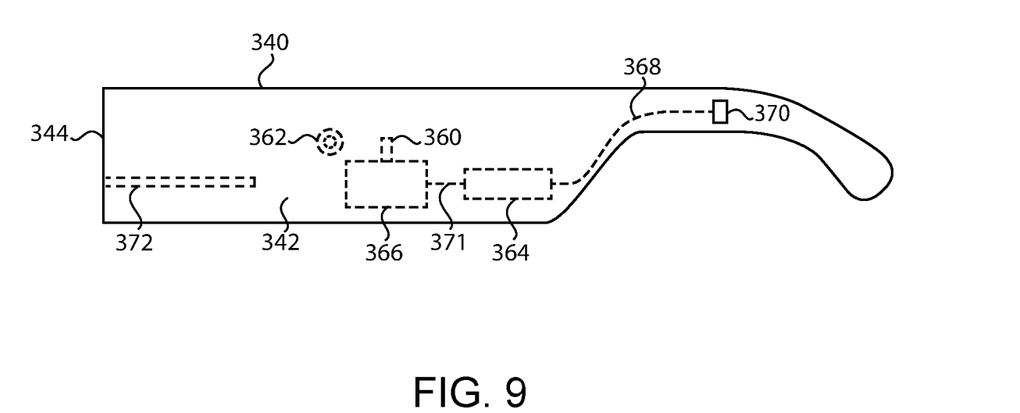
FIG. 9 is a diagrammatic side view of an eyewear temple arm, according to one embodiment.

FIGS. 8-9 show a deployable device which is removable from a temple arm member according to another embodiment. In this example, an arm member 340 includes a storage cavity 342 which is open at one end 344 sized and configured so as to allow for the deployment and stowage of a device 346 therethrough. The device 346 may be any one of those described above, but in this example includes a first portion 348 connected to a second portion 350 by a hinged portion 352. The device 346 in this example is designed for removal and replacement by a user. For example, a user might want to remove a deployable camera unit and replace it with a deployable projector. When inserted into the storage cavity 342 the device 346 rests on a slide track 372 which support the device when in the stowed position and allows the device to move between the stowed and deployed positions. The device 346 is operationally attached to a control arm member 354 which includes a drive portion 356 and a stop portion 358. The drive portion 356 includes a linear rack portion or railway configured to interface with a drive gear 362. The stop portion 358 is designed to contact a stop block 360 and prevent the device 346 from being removed entirely from the arm member 340 accidentally. In this example, the stop block 360 is operationally connected to a processor unit 366. The stop block 360 and stop portion 358 further include contact surfaces which allow them to be in electronic communication when touching. Such a configuration allows information and/or power to be transmitted from the processor 360 to the device 346 when the stop block 360 and stop portion are in contact.

The processor 360 may include one or more of memory, data storage, wireless communication capabilities, and the ability to store and run programs for the operation of a particular device 346. The arm member 340 further includes a battery 364 operationally connected to the processor 366 by a wire 371. The battery 364 is operationally connected by a wire 368 to a port 370. Port 370 allows for the transmission of power and/or information into and out of the battery 364 and/or processor 360.

Figure 10:
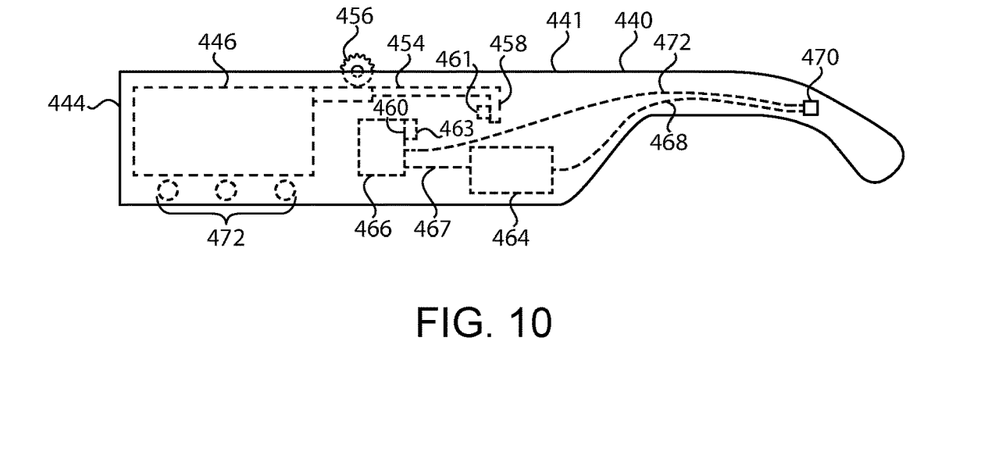
FIG. 10 is a diagrammatic side view of an eyewear temple arm, according to one embodiment.

FIG. 10 shows another embodiment of an arm member having a deployable device. The arm member 440 includes a storage cavity 442 which is open at one end 444 sized and configured so as to allow for the deployment and stowage of a device 446 therethrough. The device 446 in this example rests on a plurality of rollers 472 which support the device when in the stowed position and allow the device to move between the stowed and deployed positions. The device 446 is operationally attached to a control arm member 454 which includes a stop portion 458. The control arm member 454 is configured to interface with a manual drive wheel 462. The manual drive wheel 456 protrudes outside of the storage cavity 442 and is designed to be manually turned by a user to move the deployable device 446 between the stowed and deployed positions. In this example, the manual drive wheel is shown as protruding from the top 441 of the arm member 440. In other examples the manual drive wheel may protrude from a side or the bottom of the arm member. The stop portion 458 is designed to contact a stop block 460 and prevent the device 446 from being removed entirely from the arm member 440. In this example, the stop block 460 is operationally connected to a processor unit 466. The stop block 460 and stop portion 458 further include contact surfaces 461, 463 which allow them to be in electronic communication when touching. Such a configuration allows information and/or power to be transmitted from the processor 460 to the device 446 when the stop block 460 and stop portion are in contact. The processor 460 may include one or more of memory, data storage, wireless communication capabilities, and the ability to store and run programs for the operation of a particular device 446. The arm member 440 further includes a battery 464 operationally connected to the processor 466 by a wire 467. The battery 464 is operationally connected by a wire 468 to a port 470. In this example, the processor 466 is also operationally connected to the port 470 by a wire 472.

Figure 11:
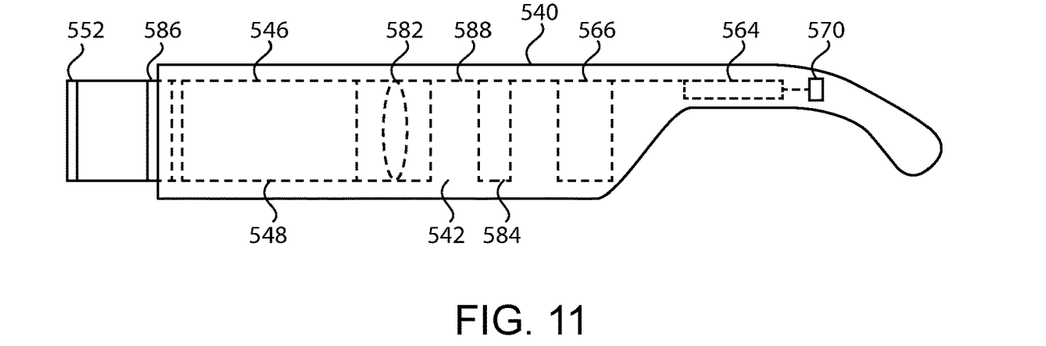
FIG. 11 is a diagrammatic side view of an eyewear temple arm, according to one embodiment.
Figure 12:
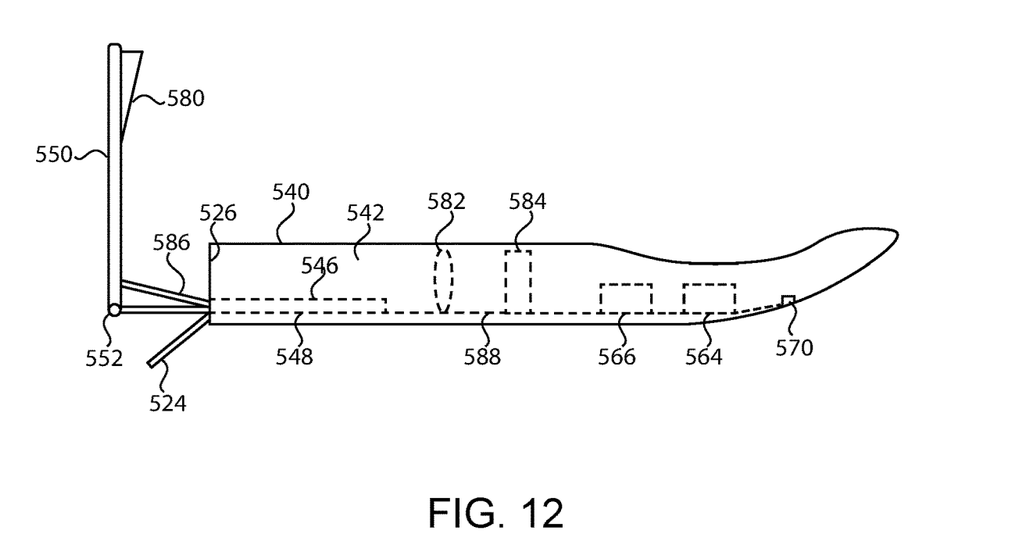
FIG. 12 is a top view of eyewear according to one embodiment.

FIGS. 11-12 show another example of an arm member 540 having a deployable device 546. In this example, the deployable device 546 has a first portion 548 and a second portion 550 connected by a hinged portion 552. When in the deployed position (as shown) a cover 524 swings open to allow the device 546 to deploy from a storage cavity 542 through an opening 526 in the end of the arm member 540. Disposed within the storage cavity 542 are an image generator 584, at least one lens 582, a processor unit 566, and a battery 564. The image generator 584 may include a projector, light-emitting diode (LED), organic light emitting diode (OLED), or other suitable source. Deployable device 546, image generator 584, processor unit 566, and battery 564 are all operationally connected (either directly or indirectly through one another) using wires 588, and are optionally operationally connected (either directly or through one another) to a port 740.

Deployable device further includes a first light redirecting device 586 and a second light redirecting device 580 which may include mirrors, prisms, fiber optic materials, reflective surfaces, and combinations thereof. Light produced from the image generator 584 passes through the at least one lens 582 before striking the first light redirecting device 586. The light redirecting devices are positioned such that light striking the first light redirecting device 586 strikes the second light redirecting device 580 and is directed into a wearer's eye.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. It will be appreciated that certain features and/or properties of the present disclosure, such as relative dimensions or angles, may not be shown to scale. As noted above, the teachings set forth herein are applicable to a variety of different assemblies, devices, systems, and methods like having or employing a variety of different structures than those specifically described herein. Other aspects, features, and advantages will be apparent upon an examination of the attached drawings and appended claims. As used herein, the articles "a" and "an" are intended to include one or more items, and may be used interchangeably with "at least one." Where only one item is intended, the term "one" or similar language is used. Also, as used herein, the terms "has," "have," "having," or the like are intended to be open-ended terms.

What is claimed is:

1. Eyewear, comprising:
  a frame having left and right temple arm member extending rearwardly at left and right sides thereof;
  left and right lenses mounted within said frame;
  at least one through passage located on the front of said frame;
  a cover disposed over the at least one through passage and movable between an open and a closed position;
  a storage cavity within at least one of the left and right temple arm member aligned with the at least one through passage;
  an electronic device disposed within said storage cavity and movable between a stowed position entirely within the cavity and a deployed position partially in front of said frame.

2. The eyewear of claim 1, wherein the electronic device is selected from the group of video display screens, video projectors, cameras, lights, microphones, speakers, lenses, sensors, and combinations thereof.

3. The eyewear of claim 1, wherein the temple arm member further includes a processor unit operationally connected to the electronic device.

4. The eyewear of claim 3, wherein the at least one of the left and right temple arm member further includes an access port in electronic communication with the processor unit.

5. The eyewear of claim 3, wherein the processor unit is capable of wireless communication using one or more of Bluetooth®, IR, RF, and WIFI.

6. The eyewear of claim 3, wherein the temple arm member further includes a battery operationally connected to the electronic device and to the processor unit.

7. The eyewear of claim 6, wherein the at least one of the left and right temple arm member further includes an access port in electronic communication with the battery.

8. The eyewear of claim 1, wherein the temple arm member further includes a battery operationally connected to the electronic device.

9. Eyewear, comprising:
  a frame having left and right temple arm member extending rearwardly at left and right sides thereof;
  left and right lenses mounted within said frame;
  a through passage located on the front of said frame disposed in front of each of the left and right temple arm members;
  a cover disposed over each through passage and movable between an open and a closed position;
  a storage cavity within each of the left and right temple arm members aligned with the through passages;
  an electronic device disposed within each of said storage cavities and movable between a stowed position entirely within the cavity and a deployed position partially in front of said frame.

10. The eyewear of claim 9, wherein the electronic devices are selected from the group of video display screens, video projectors, cameras, lights, microphones, speakers, lenses, sensors, and combinations thereof.

11. The eyewear of claim 10, wherein the electronic devices are different from one another.

12. The eyewear of claim 9, wherein each electronic device is removable and replaceable with another electronic device.

13. The eyewear if claim 9, wherein the left temple arm member and right temple arm member are removable and replaceable from the frame.

14. Eyewear, comprising:
  a frame having left and right lenses mounted therein;
  left and right temple arm members extending rearwardly from said frame;
  a through passage located on the front of said frame and disposed in front of each of the left and right temple arm members;
  a cover member disposed over each through passage and movable between a stowed position and a deployed position;
  each of the left and right temple arm members having storage cavity therein and a tip portion, the storage cavities each having an open end disposed distal from the tip portion, the open ends being aligned with the through passages;
  an electronic device disposed within each of said storage cavities and movable between a stowed position entirely within the cavity and a deployed position partially in front of said frame.

15. The eyewear of claim 14, wherein the electronic devices are selected from the group of video display screens, video projectors, cameras, lights, microphones, speakers, lenses, sensors, and combinations thereof.

16. The eyewear if claim 14, wherein the left temple arm member and right temple arm member are removable and replaceable from the frame.

17. The eyewear of claim 14, wherein at least one temple arm member further includes a processor unit and a battery operationally connected to the electronic device.

18. The eyewear of claim 17, wherein the battery is rechargeable wirelessly.

19. The eyewear of claim 14, wherein at least one cover member is attached to said frame.

20. The eyewear of claim 14, wherein at least one cover member is attached to an electronic device.

\* \* \* \* \*